(12) United States Patent
Oda et al.

(10) Patent No.: US 7,444,176 B2
(45) Date of Patent: Oct. 28, 2008

(54) FOLDING PORTABLE ELECTRONIC EQUIPMENT

(75) Inventors: Hirofumi Oda, Hiroshima (JP); Kimiaki Imai, Hiroshima (JP); Yoshihiko Handa, Hiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 56 days.

(21) Appl. No.: 11/709,761

(22) Filed: Feb. 23, 2007

(65) Prior Publication Data

US 2007/0205122 A1    Sep. 6, 2007

(30) Foreign Application Priority Data

Mar. 2, 2006    (JP) .............................. 2006-056775

(51) Int. Cl.
*H04M 1/00*    (2006.01)
(52) U.S. Cl. .................... 455/575.3; 206/320; 379/440; 379/446; 379/451; 455/575.8
(58) Field of Classification Search ................ 206/305, 206/320; 361/679, 680, 681, 683; 379/430, 379/437, 440, 446, 449–451, 454, 455; 455/575.1, 455/575.3, 575.4, 575.8
See application file for complete search history.

(56) References Cited

U.S. PATENT DOCUMENTS

| | | | | |
|---|---|---|---|---|
| 2002/0104769 A1* | 8/2002 | Kim et al. | .................... | 206/320 |
| 2003/0217940 A1* | 11/2003 | Russell et al. | ............... | 206/320 |
| 2006/0160586 A1* | 7/2006 | Cheng | ..................... | 455/575.8 |
| 2006/0175370 A1* | 8/2006 | Arney et al. | ................. | 224/666 |
| 2007/0201689 A1* | 8/2007 | Uramoto et al. | ............. | 379/451 |

FOREIGN PATENT DOCUMENTS

| | | |
|---|---|---|
| JP | 11-285408 A | 10/1999 |
| JP | 11-299522 A | 11/1999 |
| JP | 2005-136261 A | 5/2005 |

* cited by examiner

*Primary Examiner*—Luan K Bui
(74) *Attorney, Agent, or Firm*—Birch, Stewart, Kolasch & Birch, LLP

(57) ABSTRACT

A first box body is inserted between a first flat part and a first frame portion of a cover and is fastened to the cover by means of a first fastening member so that the first frame portion is interposed between the first box body and a plate-shaped first fixing member forming a first fixing member window for exposing a display section. A second box body is inserted between a second flat part and a second frame portion of the cover and is fastened to the cover by means of a second fastening member so that the second frame portion is interposed between the second box body and a plate-shaped second fixing member forming a second fixing member window for exposing an operation section.

10 Claims, 5 Drawing Sheets

FOLDING PORTABLE ELECTRONIC EQUIPMENT

CROSS REFERENCE TO RELATED APPLICATIONS

This Non-provisional application claims priority under 35 U.S.C. § 119(a) on Patent Application No. 2006-056775 filed in Japan on Mar. 2, 2006, the entire contents of which are hereby incorporated by reference.

BACKGROUND OF THE INVENTION

1. Field of the Invention

The present invention relates to folding portable electronic equipment including a cover fitted thereto.

2. Background Art

Mobile phones are more and more widespread, and a great number of users of the mobile phones use them for sending/receiving e-mails and for making calls. The users, who carry mobile phones, would often drop the mobile phones accidentally to deface the appearance thereof.

To tackling this problem, there have been proposed various mobile phones provided with a cover for preventing the phone main body from being damaged by dropping. The mobile phones with a cover are devised so as to be readily usable by detaching the cover or so as to be usable with the cover attached as it is.

For example, Japanese Patent Application Laid Open Publication No. 11-285408A discloses a cover for securing a mobile phone which is to be fitted to user's belt or the like, and of which attachment and detachment to and from the belt or the like can be performed readily. Further, the user can make a call with the mobile phone secured to the cover.

Japanese Patent Application Laid Open Publication No. 11-299522A mentions that a cover includes upper and lower flaps to form a loop for being fitted to user's belt, and the flaps are made to adhere to the cover body at use so as not to serve as an obstacle.

In addition, Japanese Patent Application Laid Open Publication No. 2005-136261A discloses that in compact electronic equipment including a main body, which includes box bodies that secures equipment main bodies and a sheet part that fixes the box bodies, and a cover for covering the main body, the sheet part of the main body includes a flange portion protruding sideways from the box bodies, and a bag-like peripheral portion for being engaged with the flange portion is formed at the outer edge of the cover so that the cover is fitted to the sheet part.

Problems that the Invention is to Solve

In recent years, accessories for changing the appearance of a mobile phone are developed. In other words, there are demands for attaching various accessories from day to day according to user's mood, for changing accessories from season to season, for changing accessories between for private use and for business use, for changing accessories according to company, and so on.

Although a conventional cover for portable electronic equipment, such as a mobile phone or the like can prevent the equipment from damage and can prevent the user from feeling unpleasant when the equipment is in contact with the user, the appearance thereof cannot be changed according to time, purpose, or occasion. Specifically, the detachable cover of a mobile phone as in Japanese Patent Application Laid Open Publication No. 2005-136261A moves with respect to the flange portion at opening and closing unless the flange portion is bonded to the bag-like peripheral portion, resulting in easy falling off of the cover. For this reason, the flange portion must be bonded to the cover, which means that the cover cannot be detachable.

SUMMARY OF THE INVENTION

The present invention has been made in view of the foregoing and has its object of providing marketable and good-looking portable electronic equipment which is tough to damage, is hard to be disassembled at use, and is capable of being dressed up by easy replacement.

Means for Solving the Problems

To attain the above object, a first invention is directed to folding portable electronic equipment which includes: a first box body including a display section on the front side thereof; a second box body including an operation section on the front side thereof; a hinge which foldably joins the first box body and the second box body; a plate-shaped first fixing member forming a first fixing member window for exposing the display section; a plate-shaped second fixing member forming a second fixing member window for exposing the operation section; and a cover which covers at least the back faces of the first box body and the second box body, wherein the cover includes: a first flat part which covers the back face of the first box body; a first frame portion which is provided at the first flat part for covering an edge part of the first box body and which forms at the central part thereof a first cover window for exposing the display section; a second flat part which covers the back face of the second box body; a second frame portion which is provided at the second flat part for covering an edge part of the second box body and which forms at the central part thereof a second cover window for exposing the operation section; and a joint part which joins the first flat part and the second flat part, and the first box body is inserted between the first flat part and the first frame portion of the cover and is fastened to the cover by means of a first fastening member so that the first frame portion is interposed between the first box body and the first fixing member, and the second box body is inserted between the second flat part and the second frame portion of the cover and is fixed to the cover by means of a second fastening member so that the second frame portion is interposed between the second box body and the second fixing member.

In the above arrangement, the first fixing member is fixed to the first box body by means of the first fastening member with the first box body interposed between the first flat part and the first frame portion of the cover while the second fixing member is fixed to the second box body by means the second fastening member with the second box body interposed between the second flat part and the second frame portion of the cover. Accordingly, the cover is mounted firmly to the first and second box bodies, thereby being prevented from coming off accidentally. The first and second frame portions are fastened to the first and second box bodies, respectively, while being pushed by the first and second fixing members, respectively, preventing user's ear and the like from being in contact with the edge of the cover to lead to no invitation of user's unpleasant feeling. Further, the display section is exposed through the first cover window and the first fixing member window while the operation section is exposed through the second cover window and the second fixing member window, which means that the folding portable equipment with the cover can be used with no operability and viewability lowered. When the first and second fastening members are take off and the first and second fixing members are taken off, the cover can be replaced readily.

Referring to a second invention, in the first invention, the first box body includes a display section side edge part at which a first engagement protrusion for positioning the first frame portion is formed, the second box body includes an operation section side edge part at which a second engagement protrusion for positioning the second frame portion is formed, a first engagement hole for being engaged with the first engagement protrusion is formed in the first frame portion, and a second engagement hole for being engaged with the second engagement protrusion is formed in the second frame portion.

In the above arrangement, the first engagement protrusion of the first box body is engaged with the first engagement hole of the first frame portion while the second engagement protrusion of the second box body is engaged with the second engagement hole of the second frame portion, so that the cover is mounted and positioned accurately to the first and second box bodies. Accordingly, the display section and the operation section are prevented reliably from being covered with the cover, thereby attaining folding portable equipment usable with no the operability and the viewability lowered.

Referring to a third invention, in the second invention, a receiving section and a mouthpiece section are provided in the first box body and the second box body, respectively, a receiver through hole is formed in the first fixing member so as to correspond to the receiver section of the first box body, and a mouthpiece through hole is formed in the second fixing member so as to correspond to the mouthpiece section of the second box body.

In the above arrangement, the first and second fixing members are fastened to the first and the second box bodies, respectively, thereby being positioned accurately. This prevents the receiver section and the mouthpiece section from being covered with the first and second fixing members, preventing sound from being muffled and/or inaudible.

Referring to a fourth invention, in any one of the first to third inventions, a slit used for inserting the first or second box body is formed in a side on the hinge side of at least one of the first frame portion and the second frame portion.

In the above arrangement, the slit is formed in the cover. Accordingly, in mounting the cover to the first box body and the second box body, the first and second box bodies can be inserted without pulling the cover forcibly, which means easy mounting and replacement of the cover. The slit may be formed in either the first frame portion or the second frame portion. After one of the first box body and the second box body is inserted between one of the frame portions in which no slit is formed and the corresponding flat part, the slit is opened for inserting the other box body between the other frame portion and the other flat part. In the case of the slit formed in each frame portion, either box body may be inserted first. In each of the cases, the slit is covered with the first fixing member or the second fixing member, inviting no worsening of the appearance.

Referring to a fifth invention, in any one of the first to fourth inventions, the cover is made of genuine leather.

With the above arrangement, the user can enjoy natural touch and aroma which the animal of the genuine leather has.

Referring to a sixth invention, in any one of the first to fourth inventions, the cover is made of synthetic leather.

In the above arrangement, various kinds of ornaments can be provided on the surface of the synthetic leather according to its material and processing, and the synthesized leather can be cared easily.

Referring to a seventh invention, in any one of the first to fourth inventions, the cover is made of fabric.

With the above arrangement, the cover can be taken off and be washed when soiled.

Referring to an eighth invention, in any one of the first to seventh inventions, the first fixing member and the second fixing member are formed of resin molded pieces.

With the above arrangement, the fixing members can be processed easily, and color and texture thereof matching the material of the cover can be selected, improving fashionability. Further, with the fixing members having high rigidity, the receiver through hole and the mouthpiece through hole respectively formed in the first and second fixing members will not displaced, so that the fixing members will not cover the receiver through hole and the mouthpiece through hole.

Referring to a ninth invention, in any one of the first to seventh inventions, the first fixing member and the second fixing member are made of metal.

With the above arrangement, unique texture of the metal can be enjoyed. Further, with the fixing members having high rigidity, the receiver through hole and the mouthpiece through hole respectively formed in the first and second fixing members will not displaced, so that the fixing members will not cover the receiver through hole and the mouthpiece through hole.

Referring to a tenth invention, in any one of the first to seventh inventions, the folding portable electronic equipment is a folding mobile phone.

The above arrangement attains a high-grade and fashionable folding mobile phone.

DISCLOSURE OF THE INVENTION

One embodiment of the present invention will be described below with reference to the accompanying drawings.

Figure 1:
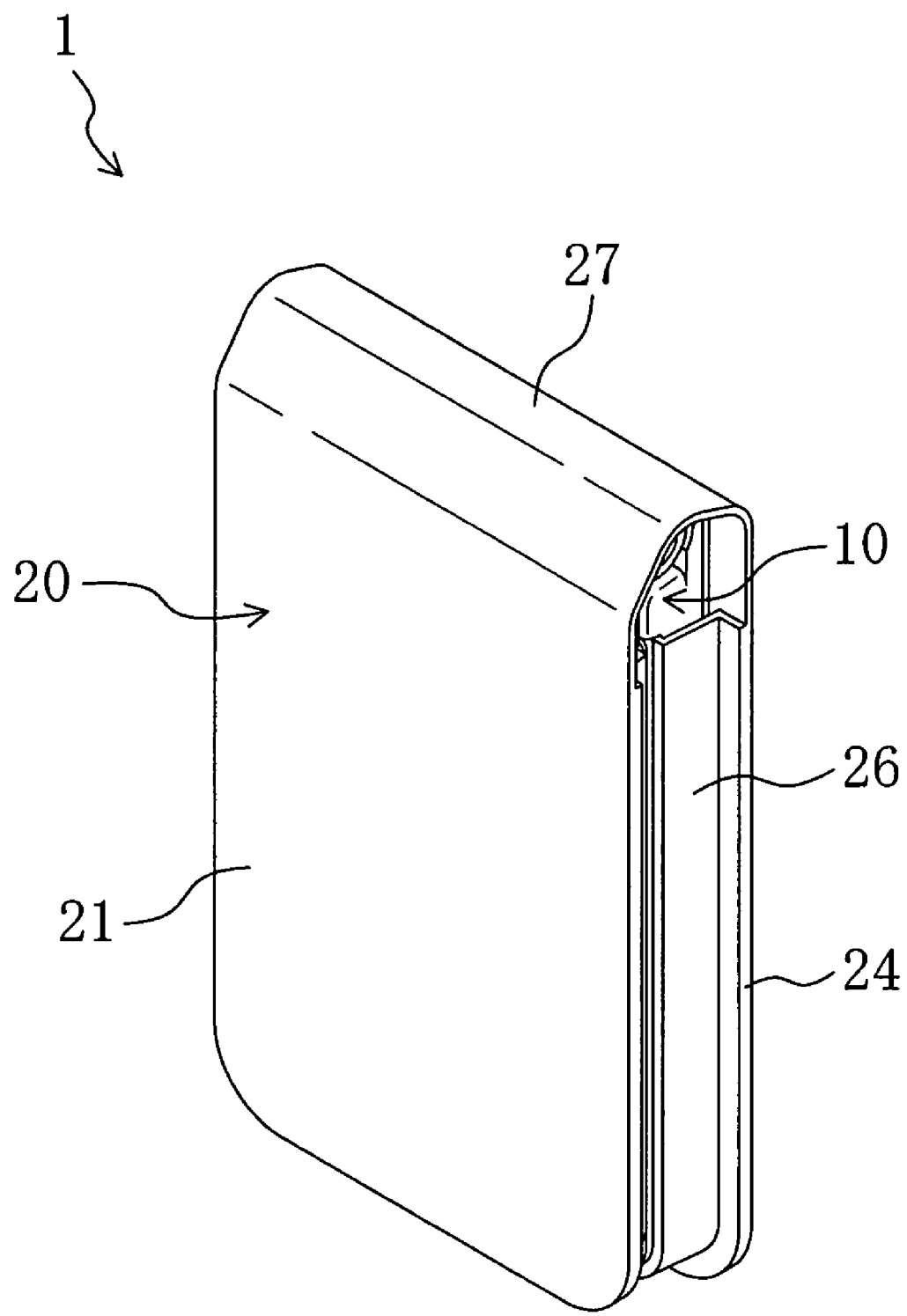
FIG. 1 is a perspective view of a mobile phone in a closed state according to one embodiment of the present invention when viewed from the right.
Figure 2:
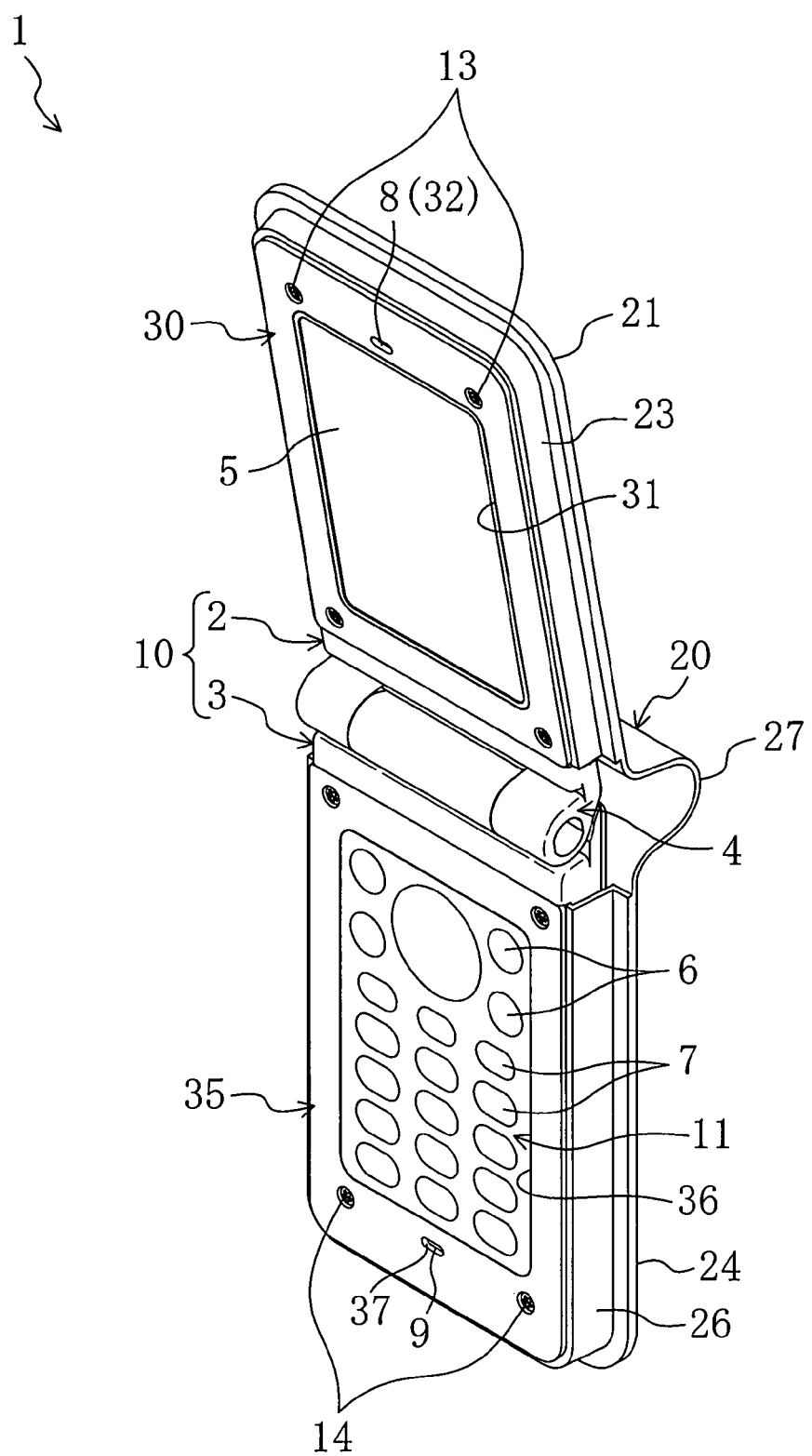
FIG. 2 is a perspective view of the mobile phone in an opened state when viewed from the right.

As shown in FIG. 1 and FIG. 2, a mobile phone 1 as folding portable electronic equipment according to the embodiment of the present invention includes a first box body 2, a second box body 3, and a hinge 4 that joins rotatably the first box body 2 and the second box body 3. A phone main body 10 is composed of the first and second box bodies 2, 3, and instruments for the mobile phone 1 are boarded inside the phone main body 10.

A display section 5, a receiver section 8, and the like are provided on the front side of the first box body 2, namely, a face fronting the second box body 3. While on the front side of the second box body 3, namely, a face fronting the first box body 2, there are provided an operation section 11 including function buttons 6 and information input buttons 7, a mouthpiece section 9, and the like.

Figure 4:
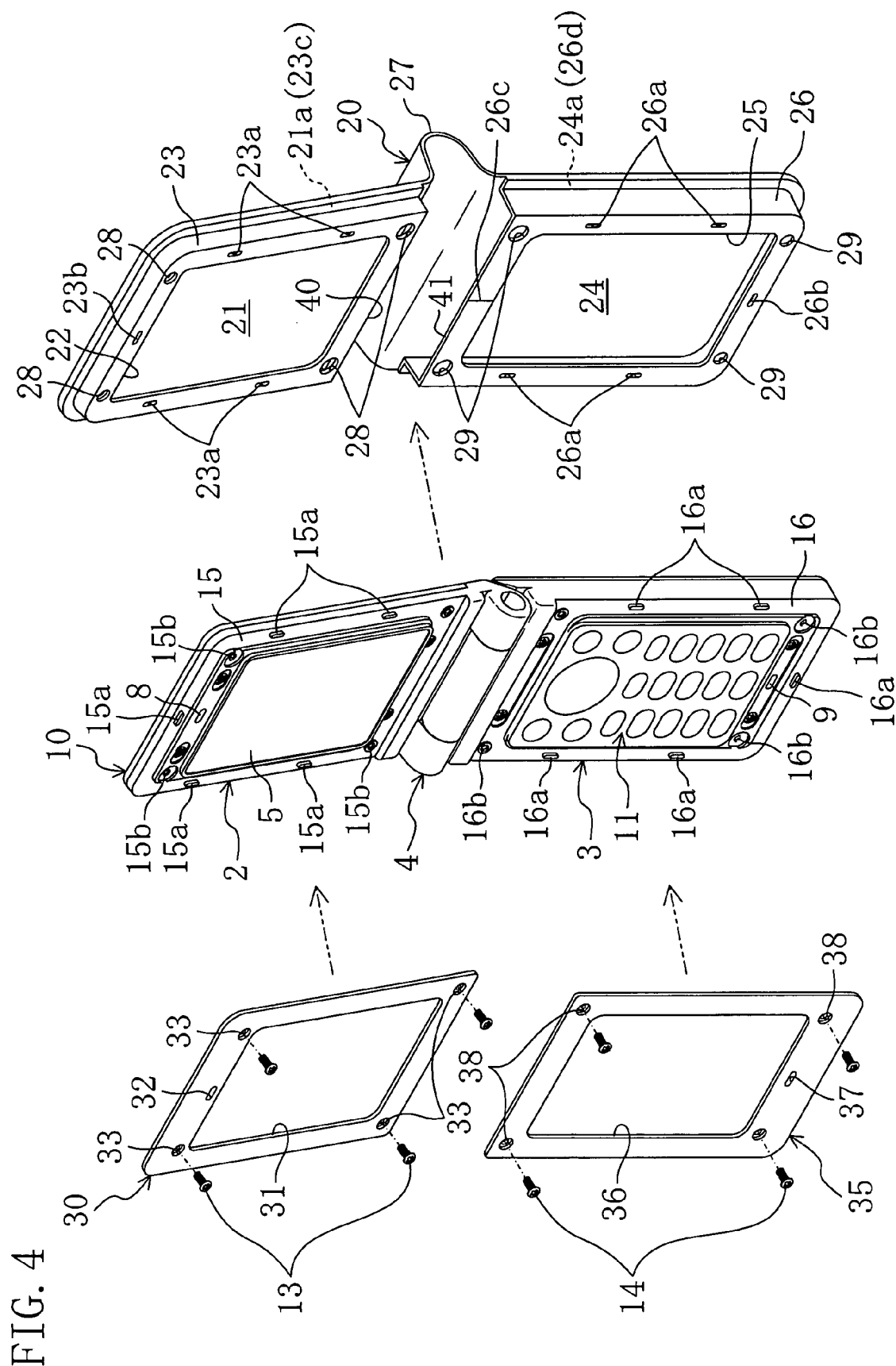
FIG. 4 is a view of the mobile pone exploded into first and second fastening members, first and second fixing members, a phone main body, and a cover.

As also shown in FIG. 4, the back face of the phone main body 10 is covered with a cover 20. The cover is made of genuine leather but may be made of synthetic leather, fabric, or a combination thereof. In the case of the genuine leather, natural touch and aroma which the animal has can be enjoyed. The cover 20 includes a first flat part 21 that covers the back face of the first box body 2, a first frame portion 23 that covers the side face of the first box body 2, a second flat part 24 that covers the back face of the second box body 3, a second frame portion 26 that covers the side face of the second box body 3, and a joint part 27 that joins the first flat part 21 and the second flat part 24. The first frame portion 23 is provided at the first flat part 21 and includes at the central part thereof a first cover window 22 for exposing the display section 5. As well, the second frame portion 26 is provided at the second flat part 24 and includes at the central part thereof a second cover window 25 for exposing the operation section 11. The first frame portion 23 and the second frame portion 26 are attached to the first flat part 21 and the second flat part 24, respectively, so as to form openings 40, 41 on the hinge 4 side thereof, respectively.

As shown in FIG. 2, space is formed between the joint part 27 and the hinge 4 and the joint part 27, and they are not joined to each other. The joint part 27 has slack with opening and closing of the mobile phone 1 taken into consideration. When the mobile phone 1 is structured so that the slack of the joint part 27 disappears in a closed state while appearing in an opened state, the appearance is improved. Alternatively, the cover 20 may have no slack. To do so, the cover 20 is cut in the vicinity of the joint part 27, and the cut portions of the cover 20 are fastened to the first box body 2 and the second box body 3 with the hinge 4 uncovered.

As shown in FIG. 4, a display section side edge part 15 of the first box body 2 is formed slightly lower in level than the display section 5 and forms first engagement protrusions 15a for positioning the first frame portion 23. For example, one first engagement protrusion 15a is formed at the upper side center of the display side edge part 15, and four first engagement protrusions 15a are formed two by two in the right and left sides thereof. Screw holes 15b for receiving first fastening members 13 are formed at the four corners of the display section side edge part 15.

Similarly, a display section side edge part 16 of the second box body 3 is formed slightly lower in level than the operation section 11 and forms second engagement protrusions 16a for positioning the second frame portion 26. For example, one second engagement protrusion 16a is formed at the lower side center of the operation section side edge part 16, and four second engagement protrusions 16a are formed two by two in the right and left sides thereof. The first and second engagement protrusions 15a, 16a are in the form of an ellipse in section in the present embodiment, but the form thereof is not limited thereto and may be a circle in section or the like. Screw holes 16b for receiving second fastening members 14 are formed at the four corners of the operation section side edge part 16.

First engagement holes 23a to be engaged with the first engagement protrusions 15a are formed at parts of the first frame portion 23 which correspond to the first engagement protrusions 15a. Second engagement holes 26a to be engaged with the second engagement protrusions 16a are formed at parts of the second frame portion 26 which correspond to the second engagement protrusions 16a.

A screw hole 28 is formed at each of the four corners of the first frame portion 23 while a screw hole 29 is formed at each of the four corners of the second frame portion 26. A slit 26c is formed at the upper side center, namely, the center of the side on the hinge 4 side of the second frame portion 26.

A first fixing member 30 is fitted to the display section side edge part 15 of the first box body 2. The first fixing member 30 is formed of a resin-molded thin plate having substantially an 0-shape in plan view with a first fixing member window 31 formed and surrounds the display section 5. A receiver through hole 32 is formed at the upper side center of the first fixing member 30 so as to correspond to the receiver section 8 provided at the first box body 2. A screw hole 33 is formed at each of the four corners of the first fixing member 30.

A second fixing member 35 is fitted to the operation section side edge part 16 of the second box body 3. The second fixing member 35 is formed of a resin-molded thin plate having substantially an O-shape in plan view with a second fixing member window 36 formed and surrounds the operation section 11. A receiver through hole 37 is formed at the lower side center of the second fixing member 35 so as to correspond to the mouthpiece section 9 provided at the second box body 3. A screw hole 38 is formed at each of the four corners of the second fixing member 35

<Cover Forming Method>

Figure 3:
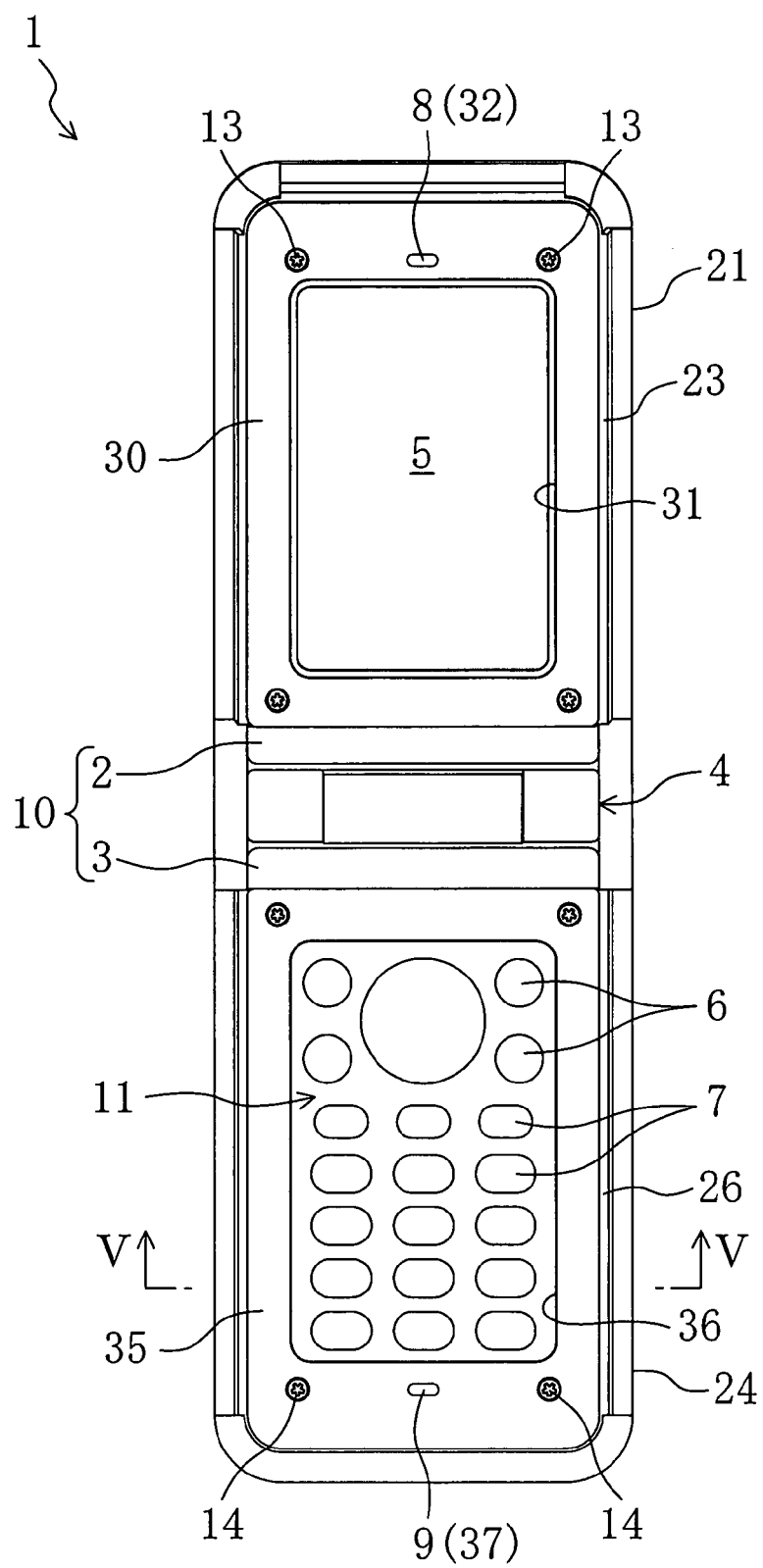
FIG. 3 is a front view of the mobile phone in the opened state.
Figure 5:
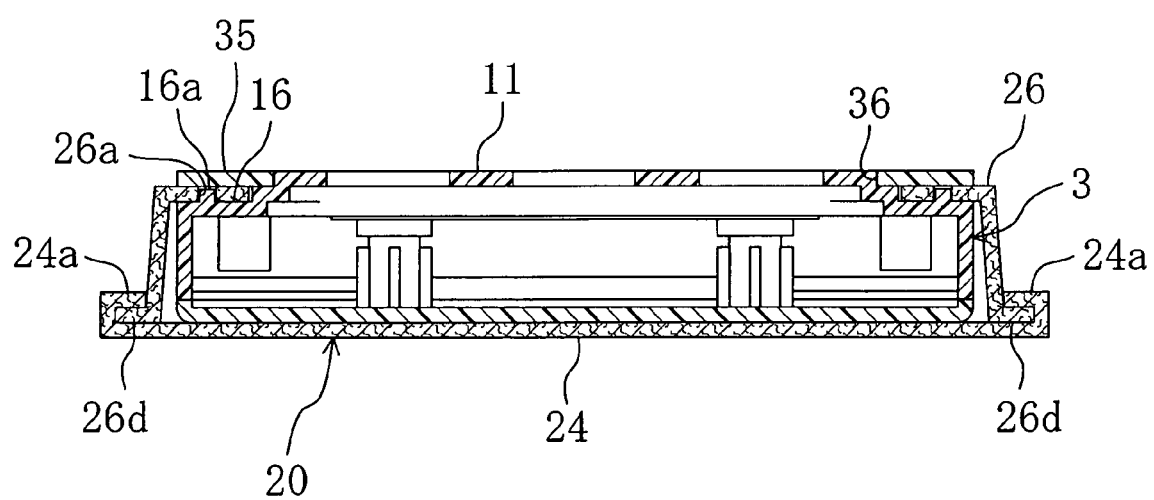
FIG. 5 is a sectional view taken along the line V-V in FIG. 3.

FIG. 5 is a sectional view taken along the line V-V in FIG. 3 and shows a typical section of the mobile phone 1, specifically, the second box body 3. A method for forming the cover 2 will be described next.

First, genuine leather for the cover 20 is cut so as to have a width and a length larger than those of the phone main body 10 to form parts corresponding to the first flat part 21, the joint part 27, and the second flat part 24.

Subsequently, parts of the cut leather portions which correspond to the peripheries of first box body 2 and the second box body 3 are folded to form margins 21a, 24a, respectively.

On the other hand, frame-shaped first and second frame portions 23, 26 for respectively covering the edge parts of the first box body 2 and the second box body 3 are prepared. The openings 40, 41 are formed on the respective hinge 4 sides of the first frame portion 23 and the second frame portion 26, respectively.

The slit 26c is formed by notching the upper side center, namely, the center of the side on the hinge 4 side of the second frame portion 26.

The flanges 23c, 26d to be inserted respectively to the margins 21a, 24a are formed at the edge parts of the first frame portion 23 and the second frame portion 26, respectively.

Thereafter, the flange 23c, 26c are stitched by a sewing machine with them inserted in the margins 21a, 24a.

<Mounting Procedure>

A procedure for mounting the cover 20 will described next with reference to FIG. 4.

First, the first fixing member 30, the first box body 2, and the cover 20, are combined by means of the first fastening members 13.

Specifically, the first box body 2 is inserted into the cover 20 through the opening 40 of the first frame portion 23. In insertion, the first engagement protrusions 15a of the display section side edge part 15 are inserted into the first engagement holes 23a for positioning so that the display section 5 is exposed from the first cover window 22.

Subsequently, the first fixing member 30 is fitted to the display section side edge part 15, the screw holes 33 of the first fixing member 30 are aligned to the screw holes 28 of the first frame portion 23, and then, the first fastening members 13 are inserted into the screw holes 15b of the first box body 2 to fasten the first fixing member 30, the first box body 2, and the cover 20.

At this stage, mounting of the cover 20 to the first box body 2 is completed.

Next, the second fixing member 35, the second box body 3, and the cover 20, are combined by means of the second fastening members 14.

Specifically, the slit 26c of the second frame portion 26 is opened first, and the second box body 3 is inserted into the cover 20. The slit 26c facilitates insertion of the second box body 3.

Thereafter, the second engagement protrusions 16a of the operation section side edge part 16 are inserted into the second engagement holes 26a for positioning so that the operation section 11 is exposed from the second cover window 25.

Next, the second fixing member 35 is fitted to the operation section side edge part 16, the screw holes 38 of the second fixing member 35 are aligned to the screw holes 29 of the second frame portion 26, and then, the second fastening members 14 are inserted into the screw holes 16b of the second box body 3 to fasten the second fixing member 35, the second box body 3, and the cover 20. Thus, the mounting of the cover 40 is completed.

The first and second fixing members 30, 35, which are resin molded pieces, can be processed easily, and color and texture thereof can be selected so as to match the material of the cover 20, thereby improving fashionability. Further, when the receiver through hole 32 and the mouthpiece through hole 37 are formed respectively in the first and second fixing member 30, 35, which have high rigidity, no displacement of the through holes 32, 37 is caused. Accordingly, the first and second fixing members 30, 35 will not cover the receiver section 8 and the mouthpiece section 9, respectively.

For replacing the cover 20, the operation in reverse to the above description is performed by taking off the first fastening member 13 and the second fastening member 14 and taking off the cover 20, and then, another cover 20 is mounted in the manner as described above.

Effects of the Embodiment

In the mobile phone 1 according to the present embodiment, the first fixing member 30 is fastened to the first box body 2 and the cover 20 by mean of the first fastening members 13 with the first box body 2 interposed between the first flat part 21 and the first frame portion 23 of the cover 20 while the second fixing member 35 is fastened to the second box body 3 and the cover 20 by means of the second fastening members 14 with the second boxy body 3 interposed between the second flat part 24 and the second frame portion 26 thereof. Accordingly, as well as the mobile phone 1 becomes tough to damage, it is hard to disassembled at use and is capable of being dressed up by easy replacement. Hence, the mobile phone 1 becomes good-looking and marketable.

Other Embodiments

The present invention may have any of the following variations in the above embodiment.

Namely, the slit 26c is formed at the upper side center, namely, the center of the side on the hinge 4 side of the second frame portion 26 in the above embodiment, but may be formed at the lower side center, namely, the center of the side on the hinge 4 side of the first frame part 23. In this case, the second box body 3 is inserted into the second frame portion 26 first, and then, the first box body 2 is inserted into the first frame member 26 with the slit 26c opened. Optionally, the slit 26c may be formed in each of the first and second frame portions 23, 26. When the slit is formed in each of them, either the first box body 2 or the second box body 3 may be inserted first. In each of the cases, the slit(s) is/are covered with the first fixing member 30 and/or the second fixing members 35, which involves no worsening of the appearance.

The cover 20 is made of genuine leather in the above embodiment, but is not limited to genuine leather. If it is made of synthetic leather, various kinds of ornaments can be provided on the surface of the cover according to its material and processing method, and the synthesized leather can be cared easily. If it is made of fabric, the cover can be taken off and be washed when soiled.

Furthermore, the first and second fixing members 30, 35 are formed of resin molded pieces, but may be made of metal. When they are made of metal, the unique texture of the metal can be enjoyed. Further, with the fixing members 30, 35 having high rigidity, the receiver through hole 32 and the mouthpiece through hole 37 respectively formed in the first and second fixing members 30, 35 will not be displaced, so that the fixing members 30, 35 will not cover the receiver through hole 32 and the mouthpiece through hole 37, respectively.

Though the folding mobile phone is exemplified as folding portable electronic equipment in the above embodiment, the folding portable electronic equipment may be any of a PHS, a PDA, a PC, an electronic dictionary, an electronic calculator, and the like of foldable type.

It is noted that the above embodiments are preferable examples essentially and is not intended to limit the scopes of the present invention, applicable subjects, and the usage.

What is claimed is:

1. Folding portable electronic equipment, comprising:
a first box body including a display section on the front side thereof;
a second box body including an operation section on the front side thereof;
a hinge which foldably joins the first box body and the second box body;
a plate-shaped first fixing member forming a first fixing member window for exposing the display section;
a plate-shaped second fixing member forming a second fixing member window for exposing the operation section; and
a cover which covers at least the back faces of the first box body and the second box body,
wherein the cover includes:
a first flat part which covers the back face of the first box body;
a first frame portion which is provided at the first flat part for covering an edge part of the first box body and which forms at the central part thereof a first cover window for exposing the display section;
a second flat part which covers the back face of the second box body;
a second frame portion which is provided at the second flat part for covering an edge part of the second box body and which forms at the central part thereof a second cover window for exposing the operation section; and
a joint part which joins the first flat part and the second flat part, and
the first box body is inserted between the first flat part and the first frame portion of the cover and is fastened to the cover by means of a first fastening member so that the first frame portion is interposed between the first box body and the first fixing member, and
the second box body is inserted between the second flat part and the second frame portion of the cover and is fixed to the cover by means of a second fastening member so that the second frame portion is interposed between the second box body and the second fixing member.

2. The folding portable electronic equipment of claim 1,
wherein the first box body includes a display section side edge part at which a first engagement protrusion for positioning the first frame portion is formed,
the second box body includes an operation section side edge part at which a second engagement protrusion for positioning the second frame portion is formed,
a first engagement hole for being engaged with the first engagement protrusion is formed in the first frame portion, and
a second engagement hole for being engaged with the second engagement protrusion is formed in the second frame portion.

3. The folding portable electronic equipment of claim 2,
wherein a receiving section and a mouthpiece section are provided in the first box body and the second box body, respectively,
a receiver through hole is formed in the first fixing member so as to correspond to the receiver section of the first box body, and
a mouthpiece through hole is formed in the second fixing member so as to correspond to the mouthpiece section of the second box body.

4. The folding portable electronic equipment of claim 1,
wherein a slit used for inserting the first or second box body is formed in a side on the hinge side of at least one of the first frame portion and the second frame portion.

5. The folding portable electronic equipment of claim 1, wherein the cover is made of genuine leather.

6. The folding portable electronic equipment of claim 1, wherein the cover is made of synthetic leather.

7. The folding portable electronic equipment of claim 1, wherein the cover is made of fabric.

8. The folding portable electronic equipment of claim 1, wherein the first fixing member and the second fixing member are formed of resin molded pieces.

9. The folding portable electronic equipment of claim 1, wherein the first fixing member and the second fixing member are made of metal.

10. The folding portable electronic equipment of claim 1, which is a folding mobile phone.

* * * * *